(12) United States Patent
Van Keeken

(10) Patent No.: US 7,959,388 B2
(45) Date of Patent: Jun. 14, 2011

(54) DEVICE FOR SECURING A WHEEL OF AN UPRIGHT MOTORCYCLE TO A TRAILER

(75) Inventor: Renee Van Keeken, Victoria (AU)

(73) Assignee: KYA Racing Pty Ltd, Victoria (AU)

( * ) Notice: Subject to any disclaimer, the term of this patent is extended or adjusted under 35 U.S.C. 154(b) by 175 days.

(21) Appl. No.: 11/597,904

(22) PCT Filed: Jun. 7, 2005

(86) PCT No.: PCT/AU2005/000812
§ 371 (c)(1),
(2), (4) Date: Nov. 29, 2006

(87) PCT Pub. No.: WO2005/120897
PCT Pub. Date: Dec. 22, 2005

(65) Prior Publication Data
US 2007/0231098 A1 Oct. 4, 2007

(30) Foreign Application Priority Data

Jun. 7, 2004 (AU) .................. 2004903071
Aug. 12, 2004 (AU) .................. 2004904545

(51) Int. Cl.
*B60P 7/08* (2006.01)
(52) U.S. Cl. .................. 410/3; 410/10; 410/11; 410/12; 410/20; 410/23

(58) Field of Classification Search .................. 410/3, 4, 410/7, 10, 11, 12, 20, 21, 23, 97; 224/403, 224/568, 572, 924; 248/499
See application file for complete search history.

(56) References Cited

U.S. PATENT DOCUMENTS

| | | | |
|---|---|---|---|
| 1,131,477 A | 3/1915 | Van Tilburg | 410/4 |
| 1,424,957 A | 8/1922 | Moore et al. | 410/20 |
| 1,708,231 A | 4/1929 | Crofoot | 410/9 |
| 1,770,798 A | 7/1930 | Otis | 410/20 |
| 2,001,935 A | 5/1935 | Nicholson | 410/67 |
| 2,023,971 A | 12/1935 | Otis | 410/67 |
| 4,852,779 A | 8/1989 | Berg | |
| 5,586,849 A | 12/1996 | Kissel et al. | 410/10 |
| 6,065,914 A * | 5/2000 | Fotou | 410/3 |
| 6,139,231 A | 10/2000 | Kissel | 410/20 |
| 6,328,511 B1 | 12/2001 | Cardona | 410/12 |

* cited by examiner

*Primary Examiner* — Stephen Gordon
(74) *Attorney, Agent, or Firm* — Jacobson Holman PLLC

(57) ABSTRACT

A device for securing a vehicle includes a frame member locatable over the upper portion of a tire of a wheel of a vehicle and; a respective tie down attachable to each of opposite sides of the frame member. Each tie down includes an attachment member at its end remote from the frame member, whereby with the frame member located over a tire, the wheel is able to be secured by engaging each connector with an anchor point below the frame member.

10 Claims, 19 Drawing Sheets

DEVICE FOR SECURING A WHEEL OF AN UPRIGHT MOTORCYCLE TO A TRAILER

This is a nationalization of PCT/AU2005/000812 filed 7 Jun. 2005 and published in English.

FIELD OF THE INVENTION

This invention provides a device for securing a vehicle in an upright position, for example, during transportation, storage or display.

BACKGROUND OF THE INVENTION

A means of anchoring a motorcycle to a base, for example, of a trailer, display stand or truck, is by using a pair of tie-downs, each in the form of a strap and having a hook provided at each end. Each of the straps may be made of a nylon material of suitable strength and is provided with adjustment means in the form of a buckle or ratchet.

In use, the motorcycle is manoeuvred to locate the tyre of its front wheel on the in a cradle or stand. In some instances, the motorcycle is simply placed onto the base or trailer without use of the stand or cradle. One end of each tie down is hooked at either side of the handlebar or fork. The other end of each tie down is then hooked to an anchor point in the ground or other base for the cradle or stand. The straps are tensioned by adjusting the buckle or ratchet to pull down on the handlebar or fork of the motorcycle, such as to compress the fork about halfway and secure the motorcycle in position. A disadvantage with using such tie downs is that considerable stress is placed on the motorcycle's suspension, resulting in wheel or fork alignment problems, uneven tyre wear or early fork seal failure.

Another arrangement consists of a metal stand or cradle for receiving the front wheel of a motorcycle. The stand or cradle has adjustable side plates between which the tyre of that wheel can be clamped to secure the vehicle. However, such stands need to be fixed or bolted to a floor if used in the transportation of a motorcycle, and require the use of additional safety straps to maintain stability of the motorcycle in transit.

The present invention seeks to provide an alternative form of device.

SUMMARY OF INVENTION

The invention provides a device for securing a vehicle, the device including a frame member locatable over the upper portion of a tyre of a wheel of a vehicle; a respective tie down attachable to each of opposite sides of the frame member; each tie down including a connector or attachment member at its end remote from the frame member, whereby with the frame member located over a tyre, the wheel is able to be secured by engaging each connector with an anchor point below the frame member.

The frame member may have a first portion and a second portion which are disposed relative to each other such that the frame member is substantially symmetrical. Each of those portions may be of U-shape and have an arcuate web which conforms to the curvature of the tyre. Preferably, each U-shaped portion has legs which diverge from its web, with the webs of the first and second portions spaced apart to engage the tyre at circumferentially spaced locations. A connecting member or bracket may be provided between these first and second portions.

The frame member may have at least one elongate load distributing member which is arcuately shaped to conform to the curvature of the tyre. A single load distributing member may extend between the first and second portions of the frame member. Alternatively, each of the first and second portions of the frame member may be provided with a respective load distributing member. The or each load distributing member may be accommodated within the U-shaped portion of each of the first and second portions and preferably is itself U-shaped in cross-section.

Preferably, the tie downs are in the form of adjustable straps.

The connector or attachment member may be in the form of a hook or other anchoring element. Preferably, the anchor point is located on a base structure or adjacent wall.

DESCRIPTION OF DRAWINGS

The invention can be more fully understood by reference to the following description with reference with the accompanying drawings, in which.

DETAILED DESCRIPTION OF THE DRAWINGS

Figure 1:
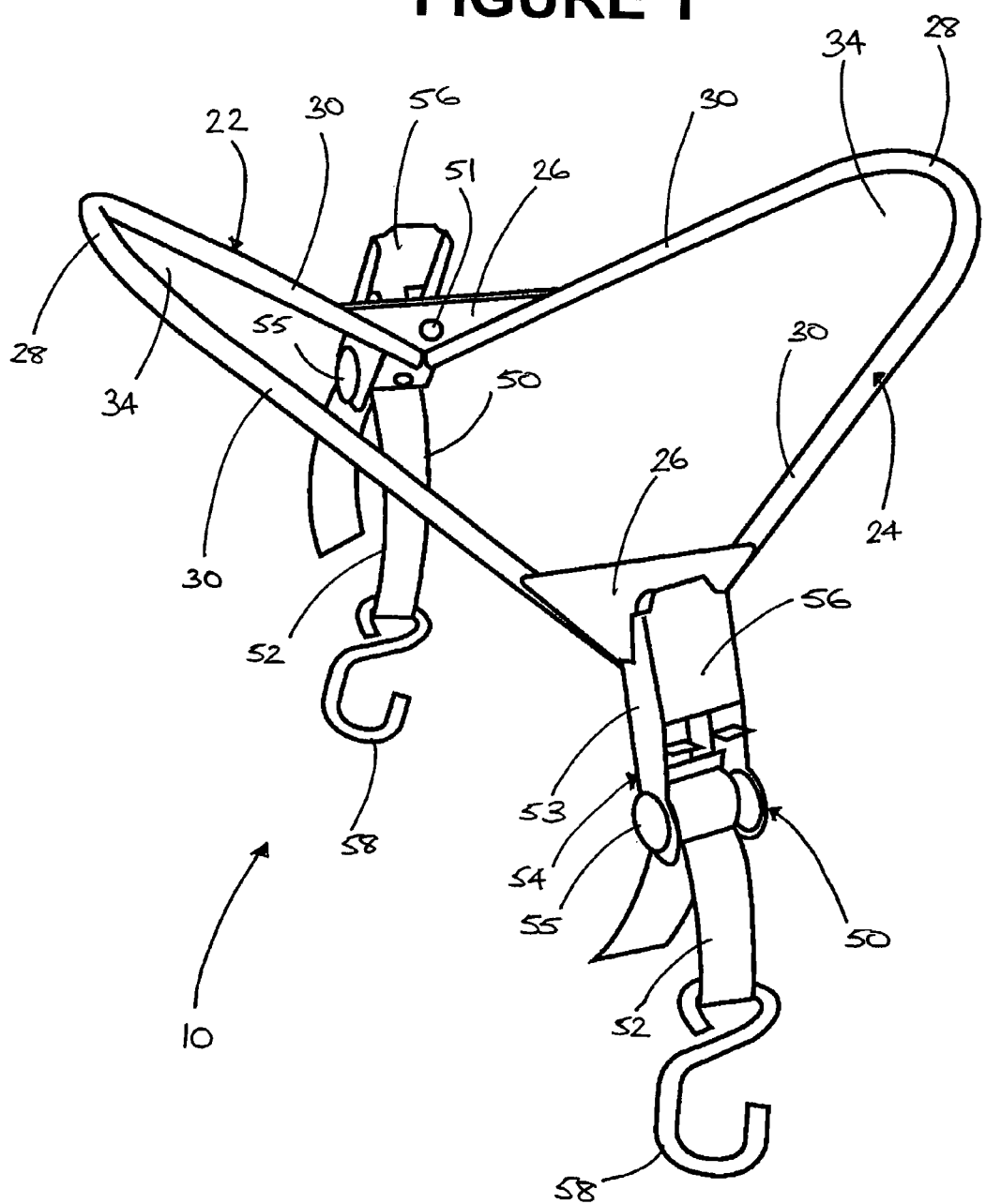
FIG. 1 is a perspective view of a first embodiment of the securing device of the invention.
Figure 2:
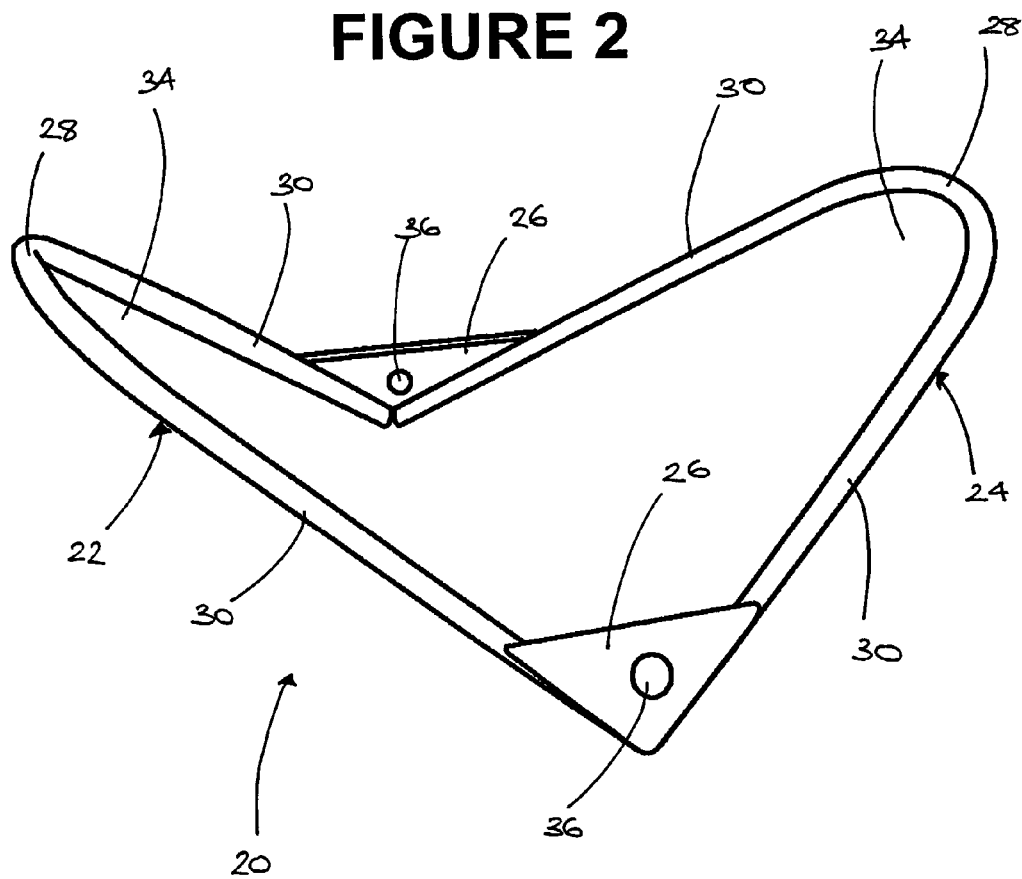
FIG. 2 is a perspective view of a component of the device of FIG. 1.
Figure 3:
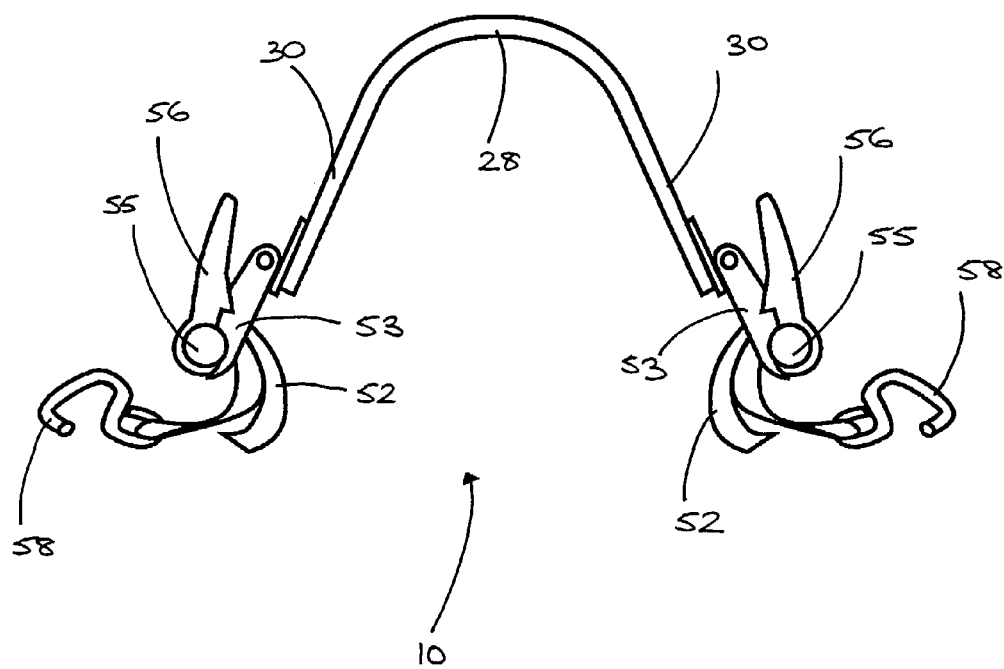
FIG. 3 is a front view of the device of FIG. 1, in an in use orientation.
Figure 4:
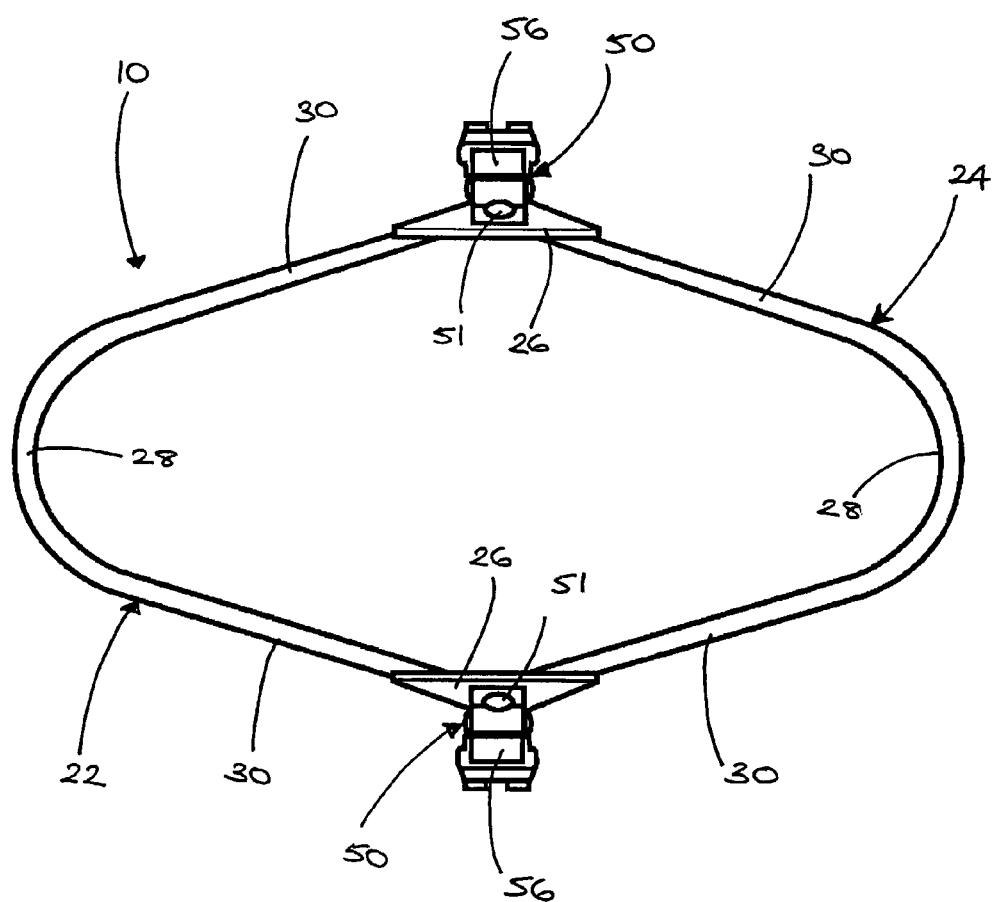
FIG. 4 is a top view of the component of FIG. 2 in the in use orientation.

FIGS. 1 and 3 depict a device 10 according to the invention for securing a vehicle. The securing device 10 has a frame member 20 and tie-downs 50. The tie downs 50 may be attached to the frame member prior to use or may be attached once the frame member is located over the tyre of a wheel. Views of the frame member 20 alone are provided by FIGS. 2 and 4. The frame member 20 is made of a material of suitable strength, such as a metal or a plastics material such as polyvinylchloride.

The frame member 20 has a first portion 22 and a second portion 24 each having a substantially U-shaped configuration. Each of portions 22 and 24 has a pair of legs 30 joined by an arcuate web 28 from which the legs 30 diverge.

The free end of each leg 30 of one of portions 22 and 24 is joined to the free end of a respective leg 30 of the other one of portions 22 and 24 by means of a respective bracket 26. In the arrangement shown, each bracket 26 is of triangular form, and a leg 30 of each portion 22 and 24 extends along a respective side of the bracket 26. Thus, each of portions 22 and 24 is in a respective one of mutually inclined planes. The arrangement is such that, relative to the in-use orientation shown in FIG. 1, frame member 20 is of inverted U-shape as viewed from either end, as shown in FIG. 3, and of V-shape as viewed from either side parallel to the plane of FIG. 3, as is evident from FIGS. 1 and 2.

Each tie down 50 includes an adjustment device 54 at one end, an attachment member 58 at its other end, and a flexible, substantially inextensible strap 52 which interconnects device 54 and member 58. The member 58 is secured to one end of strap 52, while strap 52 is adjustable engaged by device 54. Also, device 54 is adjustable or operable to adjust strap 52 longitudinally for varying the spacing between device 54 and member 58.

Each device 54 is secured to a respective bracket 26 of frame member 20. In each case, this is by means of a bolt 51 which projects from device 54 and engages in an aperture 36 of the respective bracket 26. In the arrangement illustrated, each device 54 is in the form of a ratchet assembly which has a housing 53 from which bolt 51 projects, and a ratchet handle 56 pivotably movable on housing 53 by pin 55. The handle is pivotable to draw the strap 52 longitudinally for reducing the spacing between member 58 and housing 53, while a release mechanism (not visible) enables strap 52 to be pulled in the other direction. The member 58, in the arrangement shown, is in the form of a hook.

Figure 5:
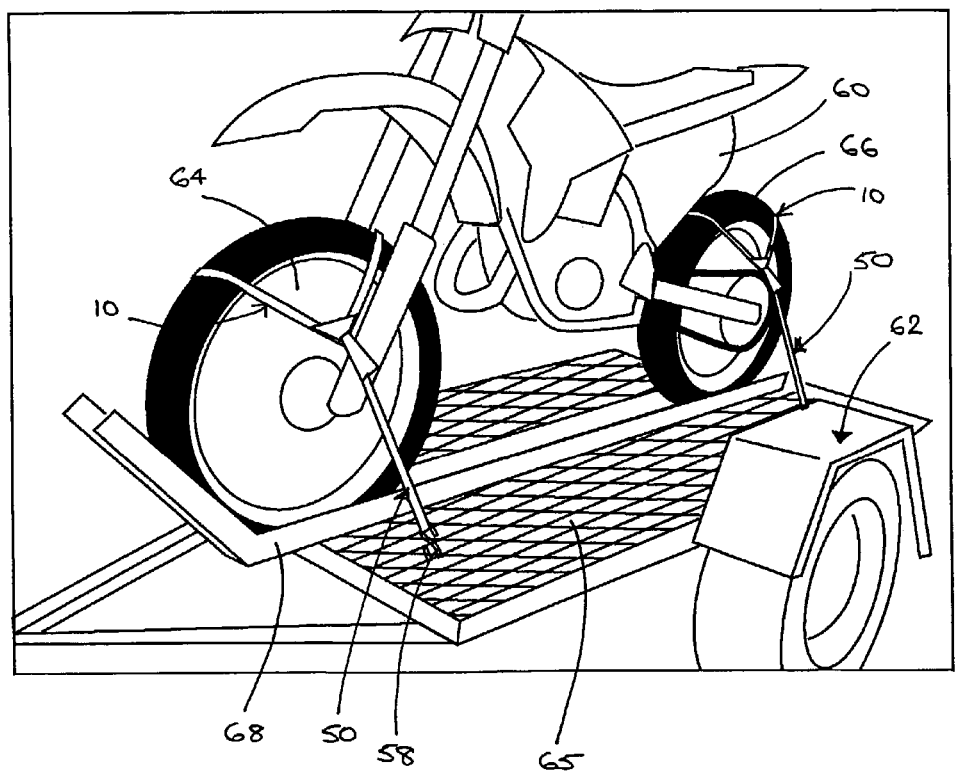
FIG. 5 is a schematic perspective view of a motorcycle secured on a trailer by use of two of the securing devices of FIGS. 1 and 3.
Figure 6:
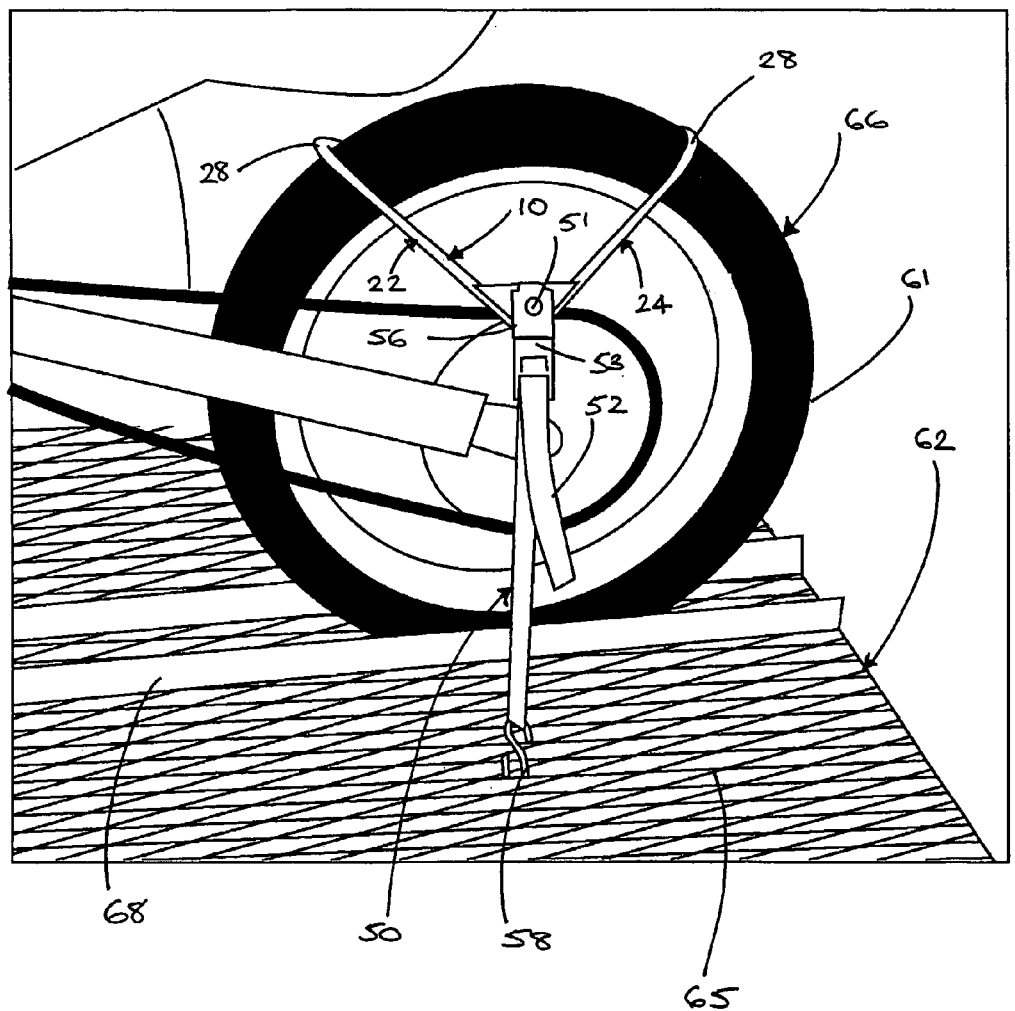
FIG. 6 is a schematic side elevational view of the rear wheel of a motorcycle shown in FIG. 5.
Figure 7:
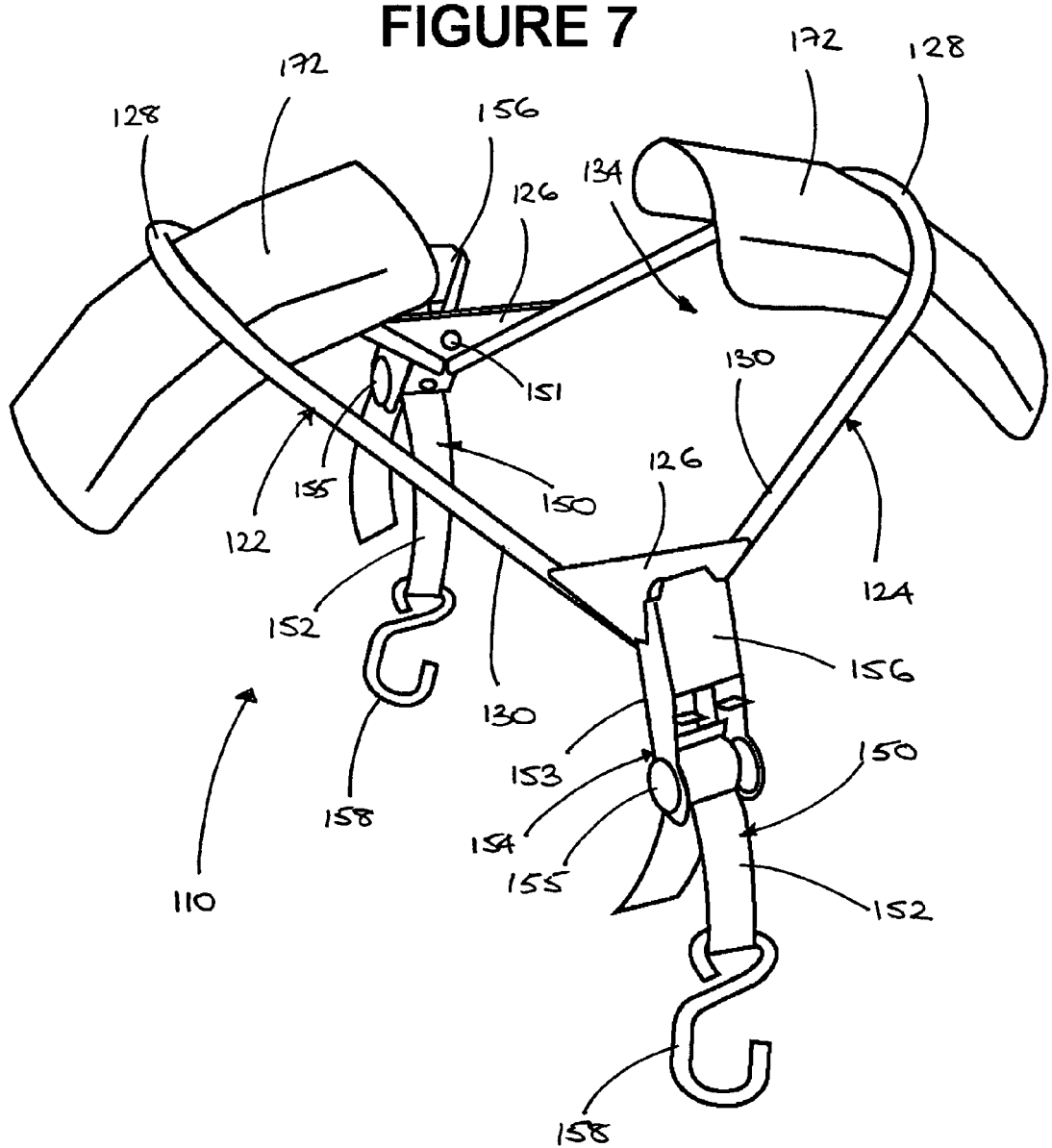
FIG. 7 is a perspective view of a second embodiment of the securing device of the invention.
Figure 8:
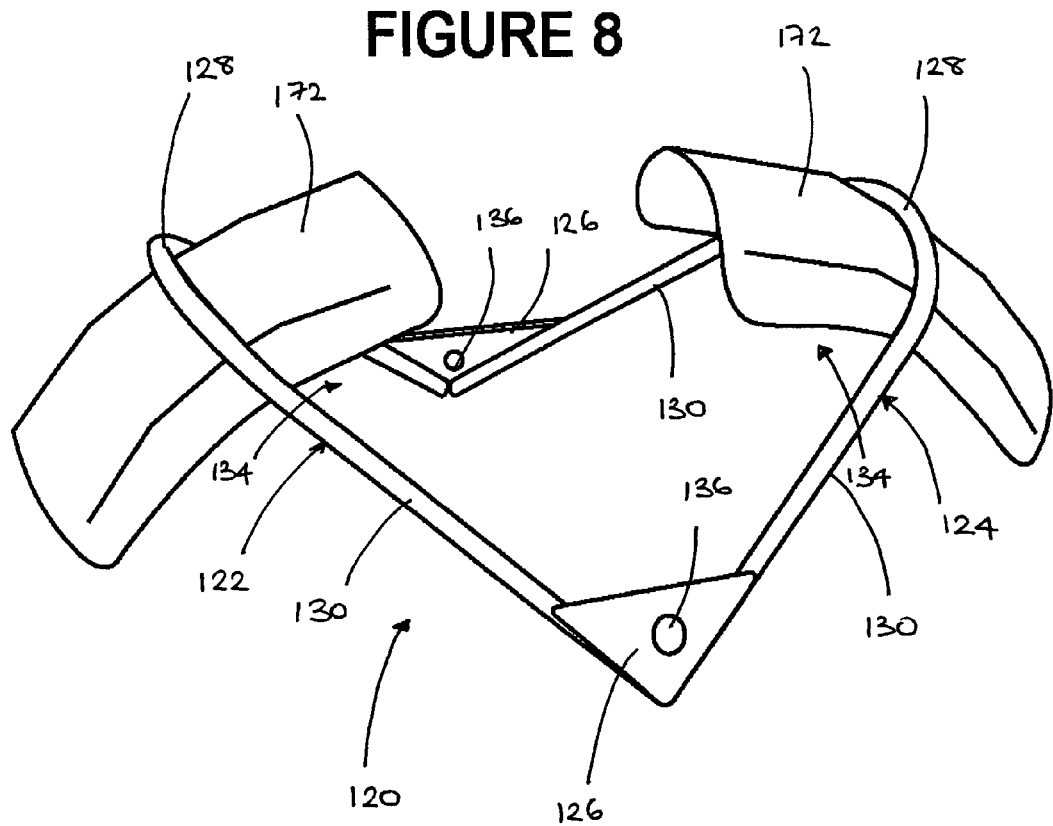
FIG. 8 is a perspective view of a component of the device of FIG. 7.
Figure 9:
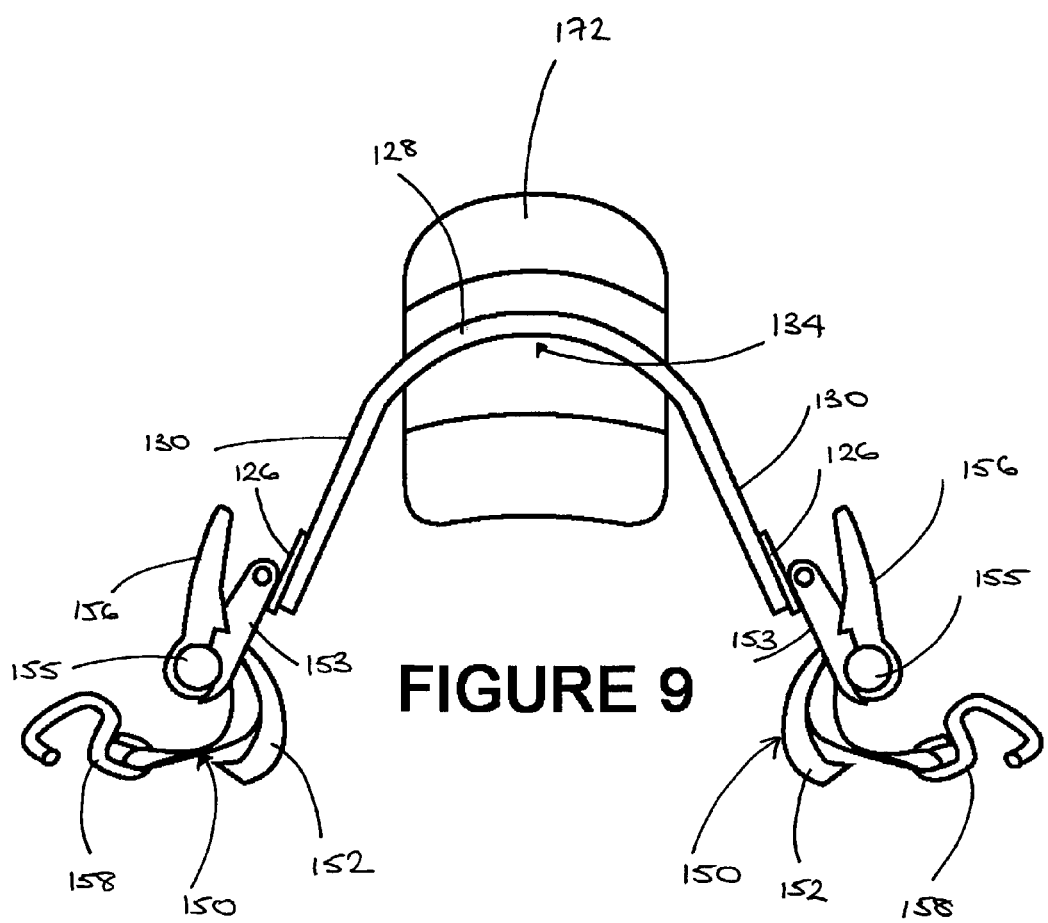
FIG. 9 is a front view of the device of FIG. 7, in an in use orientation.
Figure 10:
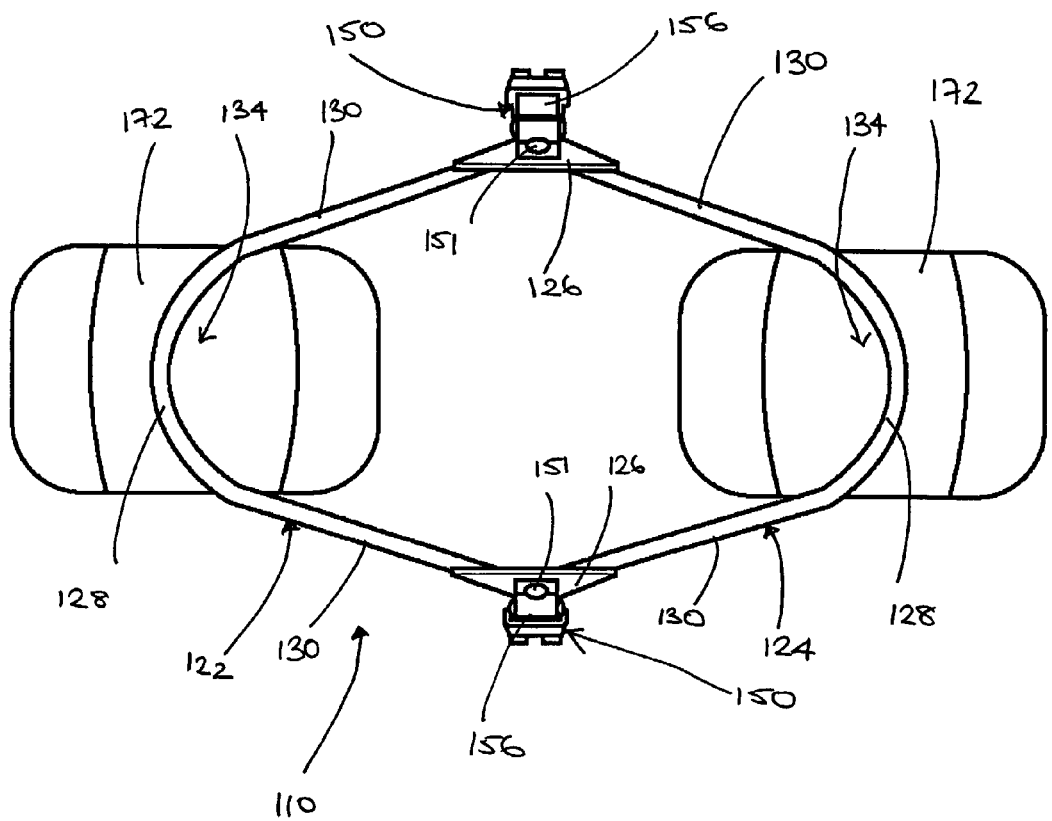
FIG. 10 is a top view of the component of FIG. 8 in the in use orientation.

FIGS. 5 and 6 depict the securing device 10 in use to secure a motorcycle 60 on a trailer 62 during transit. The front wheel 64 of the motorcycle 60 is located in a wheel guard or brace 68. A first securing device 10 is then located to position its frame member 20 over the upper portion of the back wheel 66 of the motorcycle 60 so that the portions 22 and 24 are substantially symmetrically disposed with respect to the wheel 66. Thus the upper portion of the tyre 61 is received in the space 34 within each arcuate web 28. The hook 58 of each tie down 50 is then hooked to a respective anchoring point in the base 63 of the trailer 62, and the straps 52 are tightened by working the ratchet handle 56 to tension the straps 52 for maintaining the motorcycle 60 securely in place.

The tyres shown in FIGS. 5 and 6 are slicks and have little, if any, tread patterning. Where the tyres are treaded with a cross-groove arrangement, the webs 28 are able to be located within the grooves of the tread pattern for more secure fit.

The base 63 of the trailer 62 shown is in the form of a grating, and each hook 58 is hooked under the grating lattice 65. Where the base is a solid surface, anchoring points, for example each in the form of an eye or hook, can be affixed to the base for receiving hooks 58. The anchoring points may also be located in side walls of a narrow enclosure (not shown) provided the anchoring point is at a height below the frame member 20 when in position on a wheel.

For additional security, a second securing device 10 may be similarly fitted over to the front wheel 64 of the motorcycle 60 as shown in FIG. 5. No other securing means is necessary to secure the motorcycle.

Although the embodiment of FIGS. 1 to 6 has been described with application to motorcycles, the securing device 10 may be used to secure other wheeled vehicles to a base. The same applies to the further embodiments of FIGS. 7 to 21. In each case, the device has a number of applications in transportation, storage or display.

The brackets 26 may be secured to the portions 22 and 24, such as by welding, particularly when the frame member 20 is of metal. Alternatively, particularly where the frame member is of a plastics material, the portions 22 and 24 may be formed integrally with the brackets 26. In either case, the portions need not be joined by brackets 26, but rather they may comprise respective portions of a continuous loop.

In other embodiments, the adjustment device can be of different forms. In one arrangement, it may comprise an adjustment device operable in the manner of the buckle part such as is provided on the fixed loop of a vehicle seat belt. Thus, the strap is able to be manually pulled through that device when securing a vehicle. Also, it will be appreciated, other forms of attachment member can be used, whether this be another form of hook or an alternative releasable attaching means.

In other embodiments, the frame member may comprise a single U shaped portion for location over the upper portion of a tyre so that the U shaped portion is disposed at approximately the 12 o'clock position.

FIGS. 7 to 11 depict a second embodiment of the securing device of the invention. The structure and working of the embodiment generally will be understood by the description directed to the first embodiment. The description of the second embodiment will therefore be limited to principle differences, and to assist with this, the corresponding reference numerals of the second embodiment will be the same as the first embodiment plus 100.

The first portion 122 and second portion 124 of the frame member 120 are each provided with an elongate load distributing member 172 which is arcuately shaped to conform to the curvature of a tyre. Each load distributing member 172 is accommodated within the arcuate web 128 of each of the portions 122 and 124, and is U-shaped in cross-section to correspond to the configuration of the arcuate web 128. The load distributing member 172 may be secured to the frame member 120 by welding or other suitable means. The load distributing member 172 also assists in maintaining the securing device 110 on the wheel of the vehicle to be secured. Member 172 bears against part of the circumference of the wheel and distributes the load applied for securing the vehicle.

Figure 11:
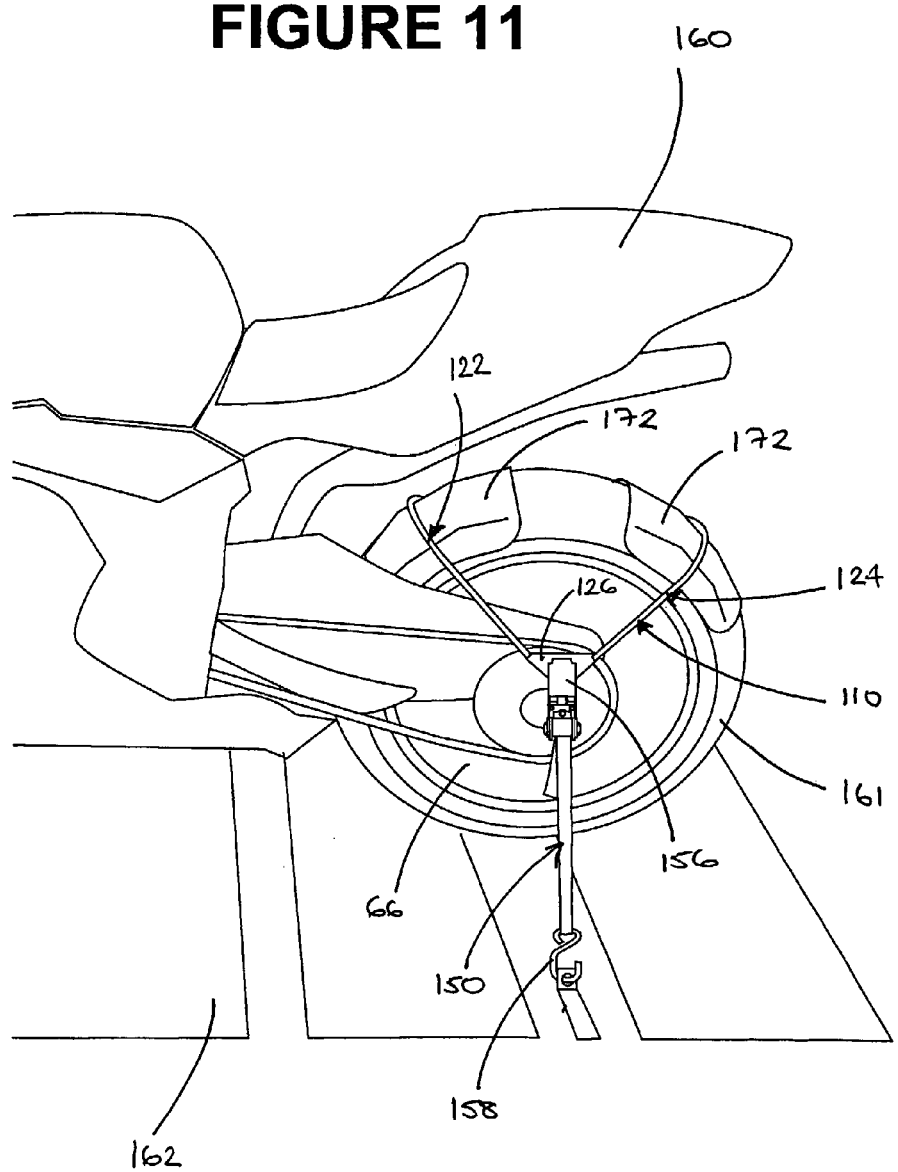
FIG. 11 is a schematic side elevational view of the rear wheel of a motorcycle secured on a trailer by use of the securing device of FIGS. 7 and 9
Figure 12:
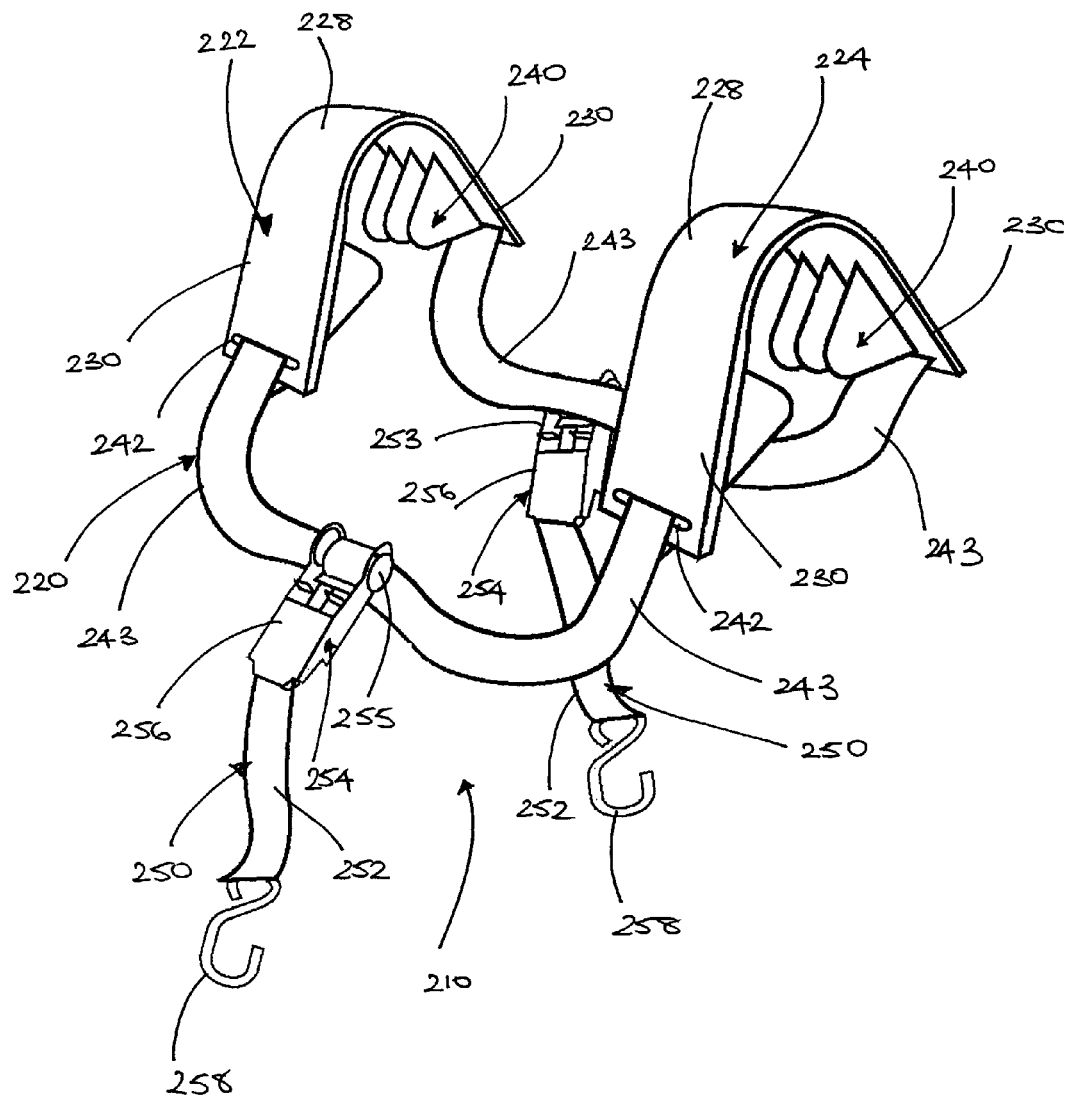
FIG. 12 is a perspective view of a third embodiment of the securing device of the invention.
Figure 13:
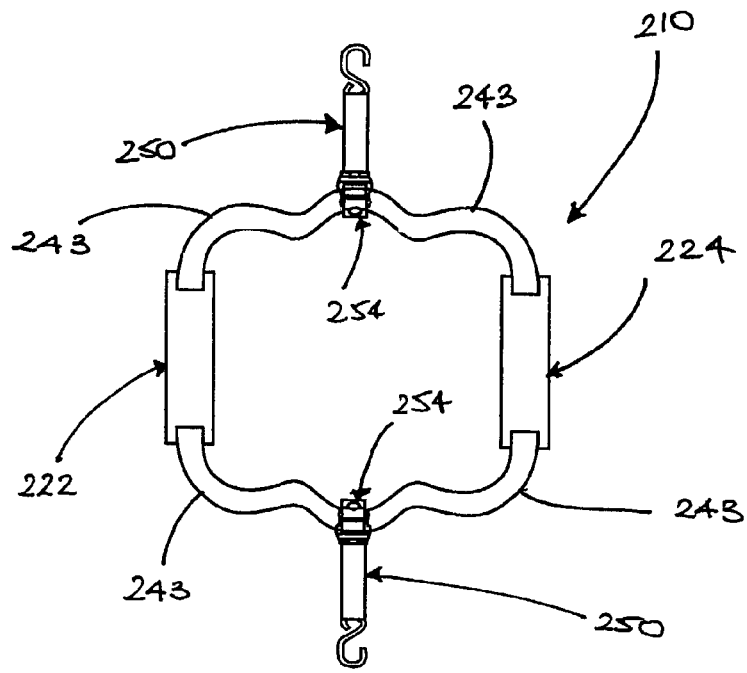
FIG. 13 is a top view of the device of FIG. 12 in an in use orientation.
Figure 14:
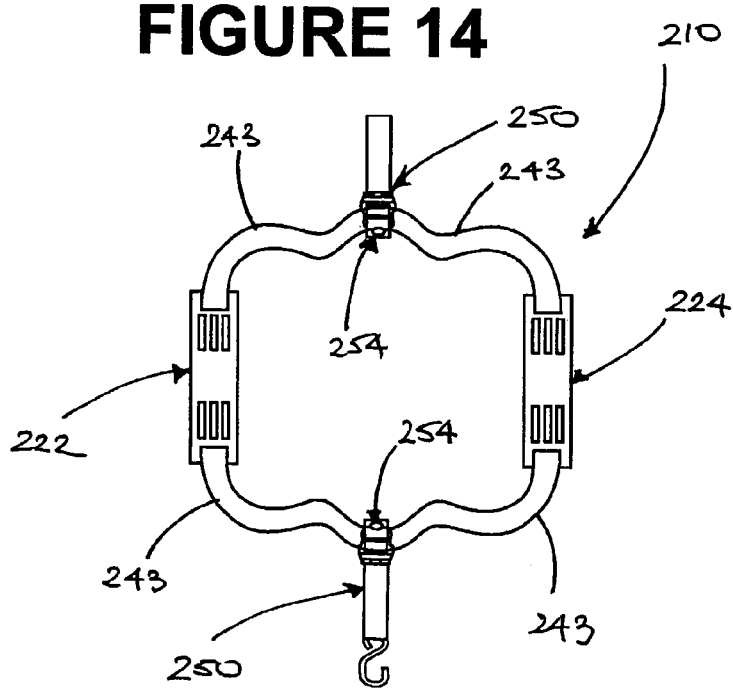
FIG. 14 is a bottom view of the component of FIG. 12 in the in use orientation.
Figure 15:
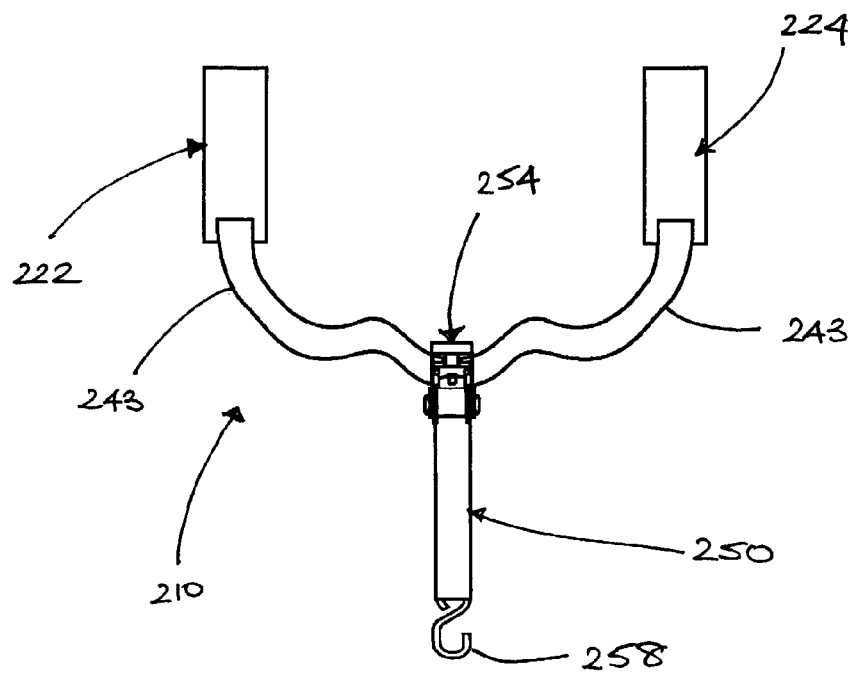
FIG. 15 is a side view of the component of FIG. 12 in the in use orientation.
Figure 16:
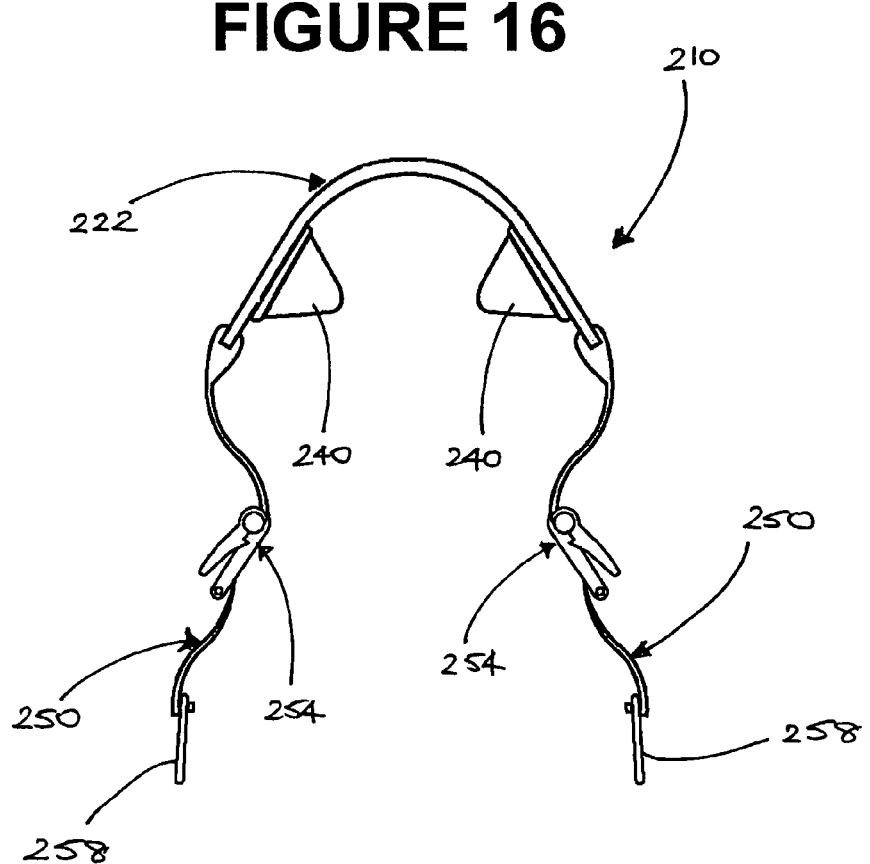
FIG. 16 is a front view of the component of FIG. 12 in the in use orientation.

FIG. 11 shows the securing device 110 in use to secure the rear wheel of a motorcycle 160 on a trailer 162 during transit. The upper portion of the tyre 161 is received in the space 134 between the arcuate webs 128 and is accommodated within the load distributing members 172.

In another embodiment (not shown), the frame member may be provided with a single load distributing member which extends between the first and second portions of the frame member. That is, relative to the embodiment of FIGS. 7 to 11, the arrangement may be such that the members 172 are end portions of a single elongate member.

FIGS. 12 to 16 depict a third embodiment of the securing device of the invention. The securing device 210 has a frame member 220 and tie-downs 250. The frame member 220 has a first portion 222 and a second portion 224 each comprising an elongate strip having a substantially U-shaped configuration. Each of portions 222 and 224 has a pair of legs 230 joined by an arcuate web 228 from which the legs 230 diverge. The portions 222 and 224 are made of a suitable flexible plastics material, for example of a hard plastics material such as polyvinylchloride or a hard rubber material, such that each pair of legs 230 is able to be flexed apart.

The inner surface of each of the legs 230 of portions 222 and 224 is provided with an abutment means in the form of a series of fins 240 which, in this instance, are of a substantially triangular configuration. The fins 240 may be made of a hard plastics or hard rubber material and they may be formed integrally with the portions 222 and 224. On each portion 222 and 224, a series of fins 240 on one leg 230 is positioned opposite to a series of fins 240 on the other leg 230. In the embodiment shown, a series of three fins 240 is provided on each leg 230 such that the faces of the fins 240 on each leg 230 are located in parallel arrangement. A slot 242 is provided in the end of each leg 230 adjacent each series of fins 240.

The portions 222 and 224 are connected by way of a pair of straps 243, the ends of which are received in the slots 242. The ends of the each strap 243 are secured to the portions 222 and 224 by means of stitching (not shown) or by any suitable fastener. A pair of tie-downs 250, as described above in relation to the first embodiment, is attached to each side of the frame member 220. Each tie-down 250 is attached to the centre portion of each strap 243 and is affixed thereto by stitching (not shown) or by any suitable fastener, for example, a clip. In the embodiment shown, the strap 243 is made of a fabric or nylon material of suitable strength.

In alternative embodiments, strap 243 may be replaced by a rigid or semi-rigid frame which is of substantially V-shaped configuration which is the configuration strap 243 adopts when in use.

Figure 20:
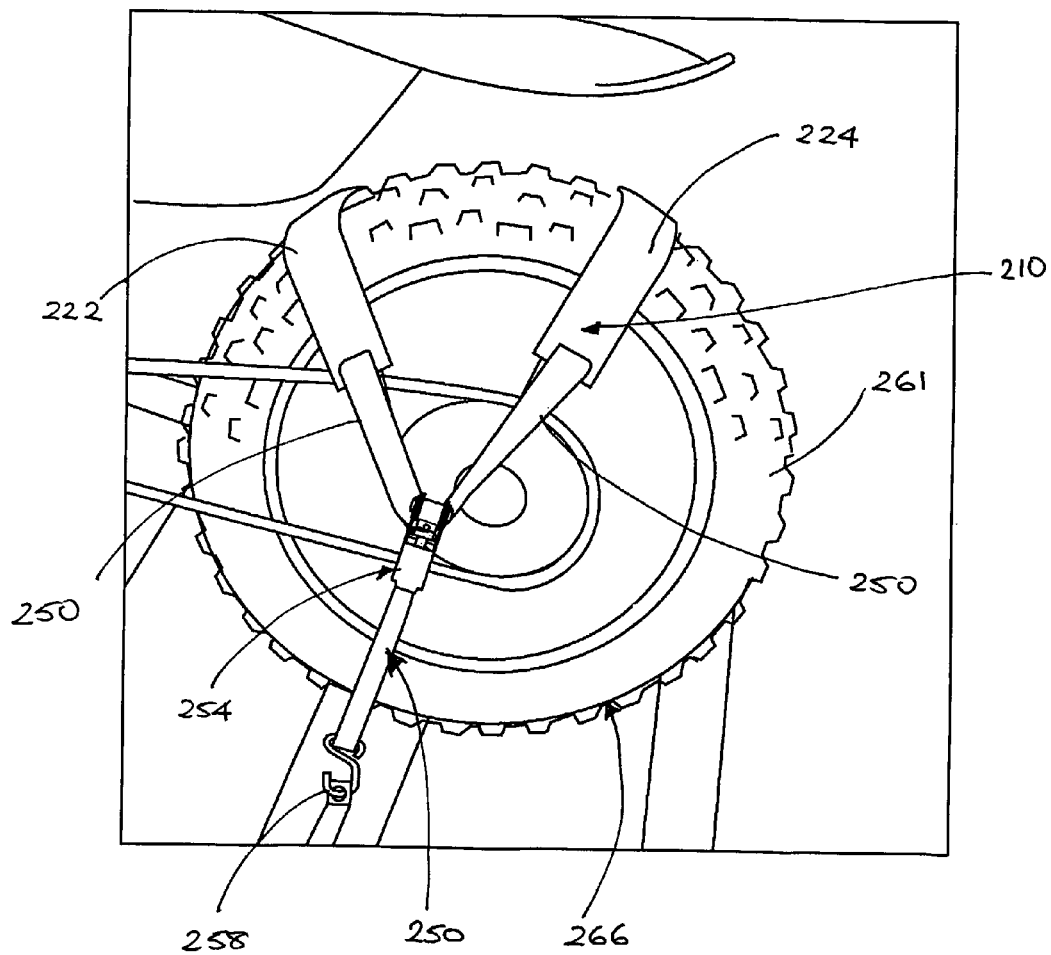
FIG. 20 is a schematic side elevational view of the rear wheel of a motorcycle secured on a trailer by the securing device of FIG. 12.
Figure 21:
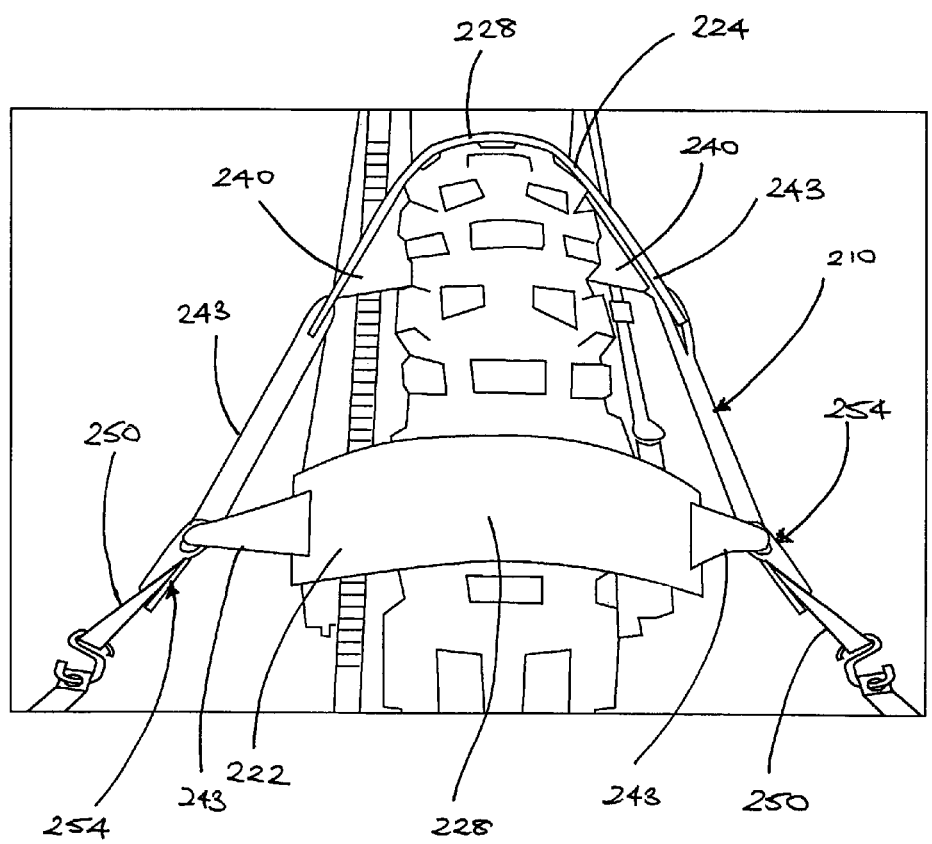
FIG. 21 is an enlarged schematic rear view of the rear wheel of FIG. 20.

FIGS. 20 and 21 depict the securing device 210 in use to secure the rear wheel 266 of motorcycle 260 on a trailer 262 during transit. The legs 230 of each portion 222 and 224 are flexed apart and located to position frame member 220 over the upper portion of the back wheel 266 of the motorcycle 260 so that the portions 222 and 224 are substantially symmetrically disposed with respect to wheel 266, at approximately the 1 o'clock and 11 o'clock positions. Thus the upper portion of the tyre 261 is received in the space 234 between the arcuate webs 228. The resilience of portions 222 and 224 is such that they are able to firmly grip tyre 261.

The hook 258 of each tie downs 250 is then hooked to a respective anchoring point in the base 263 of the trailer 262, and the straps are tightened by working the ratchet handle 256 to tension the straps 252 for maintaining the motorcycle 260 securely in place. When tensioned, strap 243 adopts a V-shaped configuration. Each opposing series of fins 240 engage the grooves of the tyre tread to enable the securing device to be fitted securely.

In an alternative embodiment, portions 222 and 224 is provided with spring along web 228 to enable each portion to be prised or levered open against the bias of the spring acting to force it to a closed position.

In an alternative embodiment, each of portions 222 and 224 is in the form of an elongate strip which is substantially C-shaped to fit closely over the width and rim of the tyre. The tie downs are attached as described in the third embodiment. The C-shaped portions may be hinged so that they form the same shape as the tyre when fitted.

Figure 17:
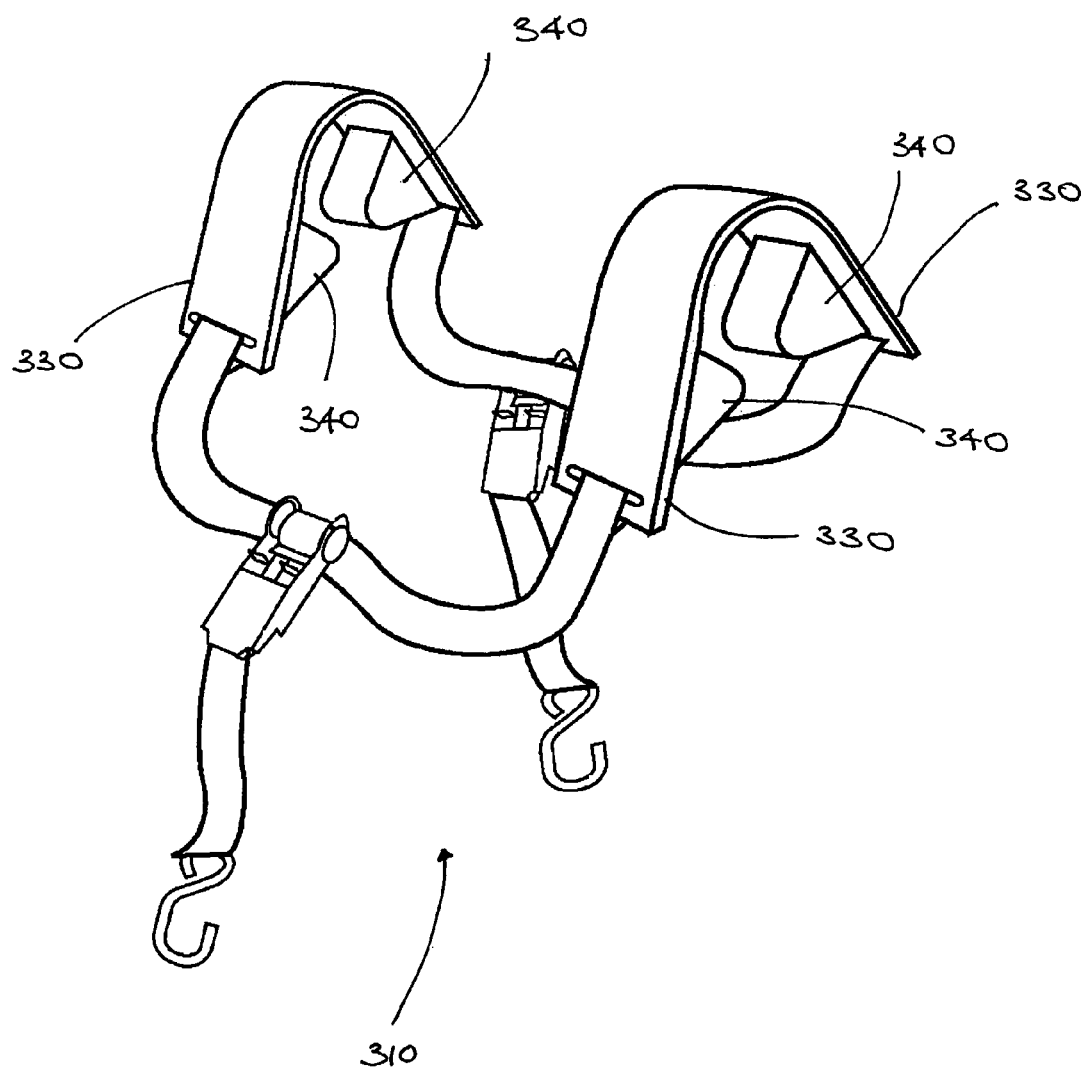
FIG. 17 is a perspective view of a fourth embodiment of the securing device of the invention.

FIG. 17 depicts a fourth embodiment 310 of the securing device of the invention which is substantially the same in structure and working as the third embodiment with the principle difference being the abutment means on the inner surface of legs 330 in the fourth embodiment is in the form of a substantially triangular shaped member 340 instead of a series of fins 240. The cross-section of member 340 is substantially the same as the faces of each of the fins 240. The member 340 may be formed integrally with portions 222 and 224.

Figure 18:
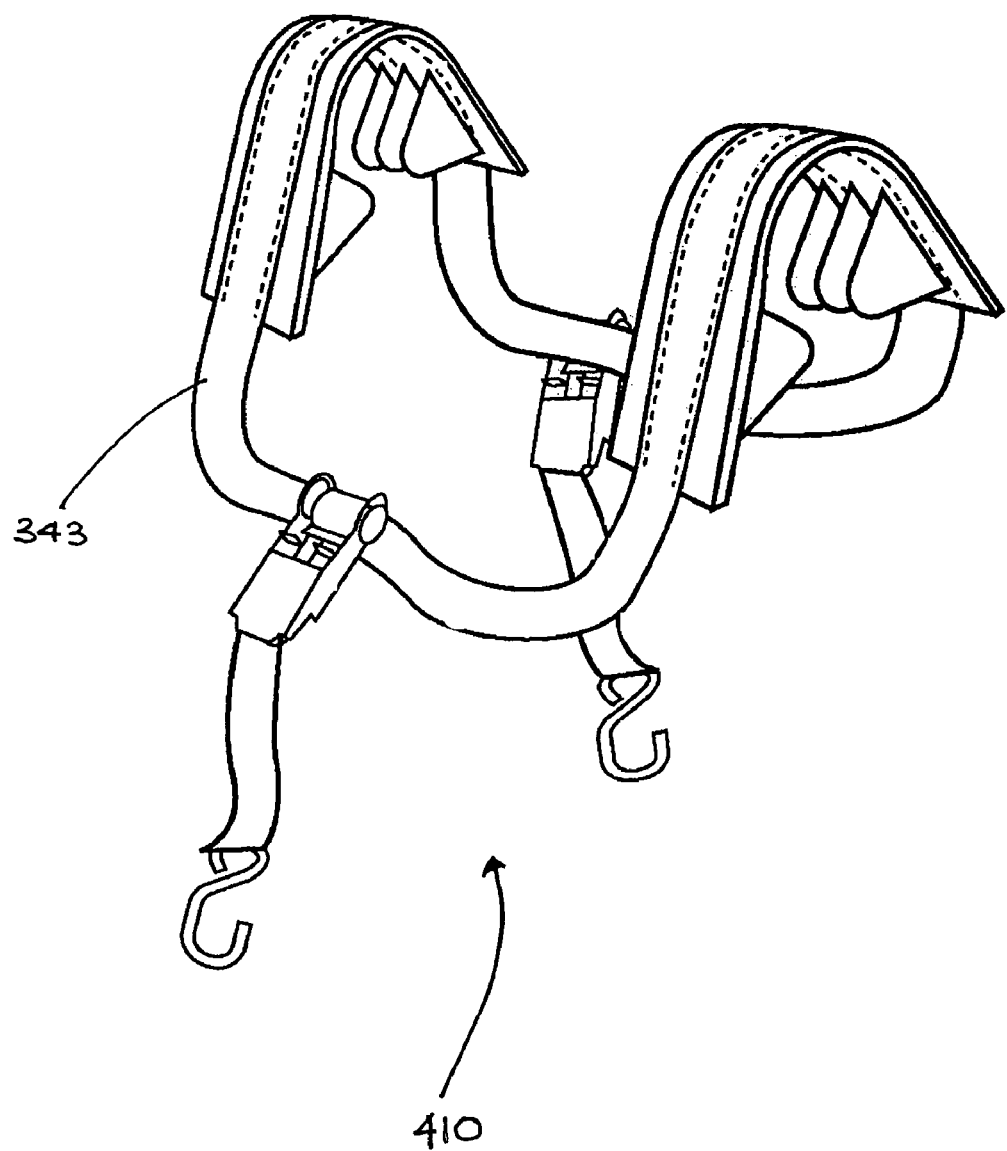
FIG. 18 is a perspective view of a fifth embodiment of the securing device of the invention.

FIG. 18 depicts a fifth embodiment 410 of the securing device of the invention which is substantially the same in structure and working as the third embodiment with the principle differences being the pair of straps 243 in the third embodiment 210 is replaced by a single continuous strap 343. The continuous strap 343, along both its edges, is stitched onto the elongate strips forming portions 222 and 224. As such, there is no need for any slots to be located at the ends of strips 344 as in the third embodiment.

Figure 19:
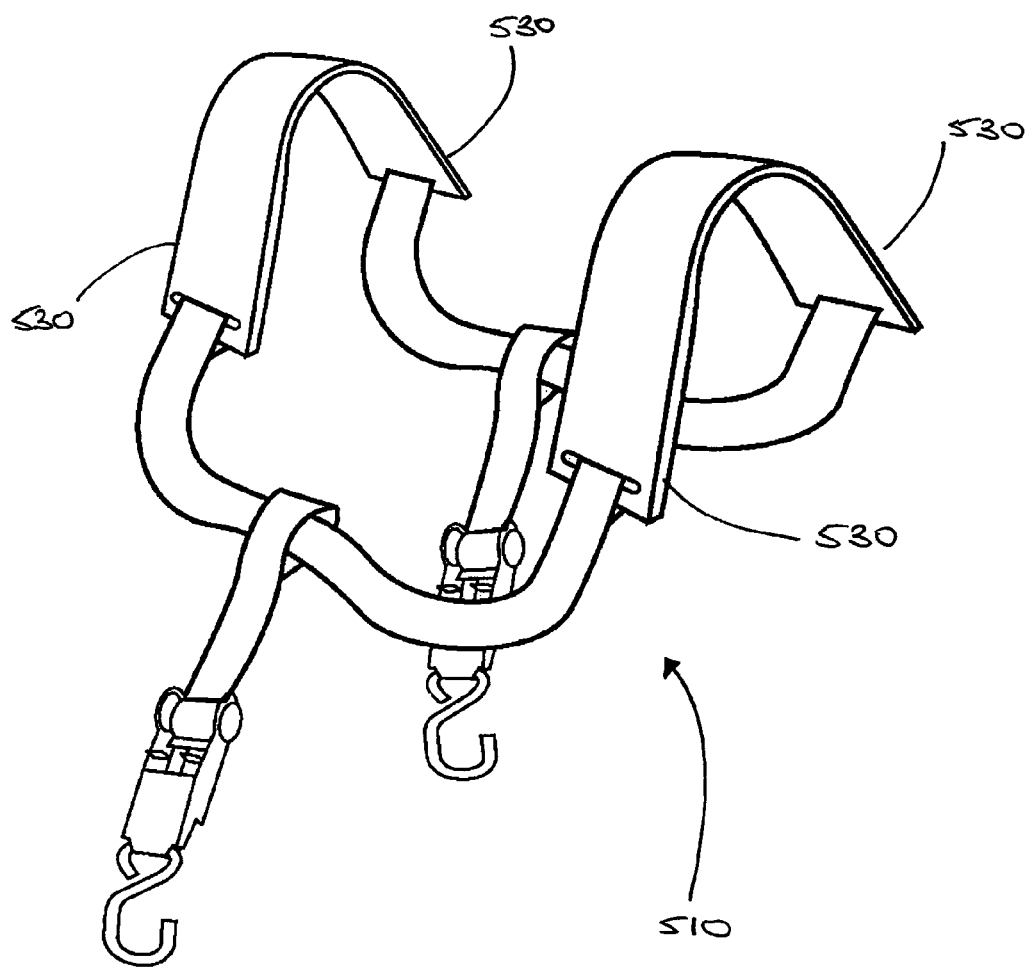
FIG. 19 is a perspective view of a sixth embodiment of the securing device of the invention.

FIG. 19 depicts a sixth embodiment 510 of the securing device of the invention which is substantially the same in structure and working as the third embodiment with the principle difference being the absence of an abutment member on the inner surface of legs 530. This embodiment is suitable for use on slick or treadless tyres.

Various other modifications or variations may be made to the embodiments described without departing from the spirit and scope of the invention.

The invention claimed is:

1. A device for securing at least one wheel of a motorcycle to a surface, said device maintaining said motorcycle in a substantially upright position relative to said surface when said at least one wheel is secured to said surface, said device comprising
    a frame member locatable over an upper portion of a tyre of said at least one wheel of said motorcycle, said frame member having a first portion and a second portion, said first portion and said second portion being disposed relative to each other such that said frame member is substantially symmetrical with respect to a positioning of said first and second portions on said tyre when said device is located over or secured to said at least one wheel,
    two connecting members being provided to interconnect an intersection of said first and second portions of said frame member such that when said frame member is positioned over the upper portion of the tyre, a straight line intersecting said two connecting members extends substantially parallel to an axle of the wheel, and
    a respective tie down attached to each of the two connecting members of said frame member, each tie down including an attachment member at an end thereof remote from said two connecting members, whereby when said frame member is located over said tyre, said at least one wheel is able to be secured to said surface by engaging each attachment member with an anchor point situated below said frame member.

2. The device as claimed in claim 1, wherein each of said first and second portions is of U-shape configuration.

3. The device as claimed in claim 2, wherein each of said first and second portions includes an arcuate web which conforms to a curvature of said tyre, and legs which diverge from said arcuate webs, and wherein said arcuate webs of said first and second portions are spaced apart to engage said tyre at circumferentially spaced locations.

4. The device as claimed in claim 1, wherein said two connecting members are brackets.

5. The device as claimed in claim 1, wherein said frame member includes at least one elongate load distributing member which is arcuately shaped to conform to a curvature of said tyre.

6. The device as claimed in claim 1, wherein said frame member includes at least one elongate load distributing member which is arcuately shaped to conform to a curvature of said tyre and wherein a single load distributing member extends between said first and second portions of said frame member.

7. The device as claimed in claim 1, wherein said frame member includes at least one elongate load distributing member which is arcuately shaped to conform to a curvature of said tyre and wherein each of said first and second portions of said frame member includes a respective load distributing member.

8. The device as claimed in claim 2, wherein said frame member includes at least one elongate load distributing member which is arcuately shaped to conform to a curvature of said tyre and wherein a respective distributing member is accommodated within a U-shaped portion of each of said first and second portions, and is U-shaped in cross-section.

9. The device as claimed in claim 1, wherein said tie downs are adjustable straps.

10. The device as claimed in claim 1, wherein said attachment members are hooks.

* * * * *